(12) United States Patent
Lass (10) Patent No.: US 7,870,802 B2
(45) Date of Patent: Jan. 18, 2011

(54) ROTARY START STOP MECHANISM

(76) Inventor: Stanley E. Lass, P.O. Box 308, Ogden, IA (US) 50212

( * ) Notice: Subject to any disclaimer, the term of this patent is extended or adjusted under 35 U.S.C. 154(b) by 1410 days.

(21) Appl. No.: 10/978,187

(22) Filed: Oct. 29, 2004

(65) Prior Publication Data

US 2006/0090583 A1     May 4, 2006

(51) Int. Cl.
    *F16H 21/00*     (2006.01)
(52) U.S. Cl. .............................. 74/68; 74/67
(58) Field of Classification Search ............ 74/67, 74/68
    See application file for complete search history.

(56) References Cited

U.S. PATENT DOCUMENTS

| | | | | |
|---|---|---|---|---|
| 1,712,444 A | * | 5/1929 | Maltby | 74/65 |
| 2,228,400 A | * | 1/1941 | Otto | 74/43 |
| 2,248,444 A | * | 7/1941 | Torok | 74/64 |
| 2,946,228 A | * | 7/1960 | Evrell | 74/68 |
| 3,028,761 A | * | 4/1962 | Cole, Jr. | 74/69 |
| 4,295,382 A | * | 10/1981 | Lollert et al. | 74/68 |
| 4,898,042 A | * | 2/1990 | Parsons | 74/68 |

\* cited by examiner

*Primary Examiner*—William C Joyce (57) ABSTRACT

An engine-flywheel hybrid in which the engine power is varied mainly by the frequency of power cycles, not by the power per power cycle. The flywheel absorbs the energy from the power cycles and delivers energy. The rotary stop start mechanism stops and starts a crankshaft efficiently with minimal energy loss. This is accomplished by varying the offset of a double crank four bar linkage. The invention allows an engine's flywheel to be quickly be brought up to speed in about a half of a revolution, followed by combustion, expansion, and stopped one revolution after starting. Further, utilizing offset, the engine crankshaft will turn faster than the input shaft when the piston is at top dead center, shortening the time of highest heat transfer, making the engine more efficient. Also, that when used as an auto engine, the part load efficiency would be near the maximum efficiency of the engine, nearly doubling the miles per gallon of the auto.

3 Claims, 7 Drawing Sheets

ROTARY START STOP MECHANISM

BACKGROUND OF THE INVENTION

This invention relates primarily to a mechanism whose input shaft can be driven by a flywheel and which stops and starts an output shaft which can drive the crankshaft of an engine.

The invention is the result of seeking a mechanism which could quickly stop an engine's crankshaft and quickly start an engine's crankshaft, and do so with minimal energy losses.

The invention is an alternative to a big starter motor which can quickly start an engine.

SUMMARY

The purpose of the invention is to stop and start an output shaft efficiently with minimal energy loss. The invention enables an engine-flywheel hybrid in which the power can be controlled by the frequency of power cycles. Conventional engines control power at an rpm by throttling and/or the amount of fuel injected per power cycle.

Given a double crank four bar linkage and a constant angular rate on the input shaft, as the offset between the crank shafts is increased, the angular rate of the output shaft will approach infinitely fast and infinitely slow(stopped). For the purpose of the invention, the infinitely slow angular rate(stopped) is useful, but the infinitely fast angular rate is not. To stop the output shaft, the offset is increased as much as is needed to achieve the infinitely slow angular rate. Away from the output shaft stopped position, the offset is decreased to avoid an extremely high output shaft angular rate.

An engine crankshaft connected to the output shaft can be stopped by declutching it from the output shaft when the output shaft is stopped. And to restart, a clutch can engage when the output shaft is once again stopped.

OBJECTS AND ADVANTAGES

A double crank four bar linkage with variable offset when positioned between the flywheel and output shaft has the advantage that the kinetic energy from slowing the output shaft to a stop is transferred into the flywheel, and later, the flywheel kinetic energy is used to bring the output shaft back up to speed.

The intended application is to quickly stop and later, to quickly start an engine's crankshaft. The engine crankshaft would be run a revolution or two as often as is needed to provide the desired level of power. In this application, the advantages are:

1) When the mechanism is used to drive the crankshaft of an engine, e.g. an engine that fires once per crankshaft revolution, or every other revolution, the combustion and expansion could be somewhat faster than the flywheel speed. The flywheel would normally be operated within a fairly narrow speed range. The power per combustion can be relatively constant. The operating parameters can be optimized for efficiency and emissions per combustion. This includes spark ignition, diesel and HCCI (homogenous charge compression ignition) engines' operation. (During warmup the power per combustion could be lower. For maximum power, the speed of the engine could be higher.)

2) At low to moderate power levels, some friction and some pumping losses are avoided by eliminating some cycling of the piston and crankshaft.

3) When used with an engine for a car, the efficiency in typical usage should be close to the maximum efficiency of the engine. This is nearly twice the efficiency of conventional car engines in typical usage. This would nearly double the miles per gallon.

4) The output shaft must turn at a faster rate than the input shaft to make up for the slowing to a stop during part of the revolution. The output shaft turns one revolution per input shaft revolution. By choosing some of that faster rate to be near the engine's piston(s) top dead center and early expansion, the duration of combustion and early expansion would be shortened, lessening the heat loss during that time. Heat energy not lost through beat transfer during combustion and early expansion remains in the combustion gas as heat and can do work expanding against the piston. This increases efficiency as compared to slower operating designs which lose more heat, (all else equal). This advantage is gained without an increase in piston speed. However, the peak piston speed is a little higher.

5) The crankshaft would be turning slower than the flywheel 180 degrees after the piston top dead center. In a two cycle engine, this lengthens the purge time, longer than it would be in a conventional two cycle engine, i.e. which has the flywheel directly coupled to the crankshaft. Accordingly, this would allow faster engine operation and/or reduced port sizes.

The engine-flywheel combination should be lighter, cheaper and more efficient than an engine-electric hybrid that uses batteries for energy storage.

LIST REFERENCE NUMERALS

12. input shaft
14. input shaft crankarm
16. input shaft crankpin
18. coupler
20. output shaft crankpin
22. output shaft crankarm
24. output shaft
26. output shaft stop tooth
28. output shaft jaw
30. rotary mechanism shaft
32. deceleration dog (engaged position)
34. deceleration dog (disengaged position)
36. tooth on rotary mechanism shaft
38. acceleration dog (disengaged position)
40. acceleration dog (engaged position)
42. rotary tooth
44. rotary jaw
50. pivot on input shaft support bracket
52. input shaft support bracket
54. input shaft
56. eccentric on input shaft
58. tooth for minimum offset
60. jaw for minimum and maximum offset
62. tooth for maximum offset
64. jaw for cyclic offset
66. tooth for cyclic offset
68. link to cyclic hold bracket 70. cyclic hold bracket
72. pivot for cyclic hold bracket

DESCRIPTION

Definitions:

A crank's radius is the distance from the crankshaft axis to the crankpin axis.

A coupler connects the crankpins of a double crank four bar linkage.

The offset is the distance between the shafts of a double crank four bar linkage.

Consider a double crank four bar linkage with the same dimension on the input shaft crank radii and the coupler length. The input shaft would have a constant angular rate. As the offset between the crank shafts is increased, the angular rate of the output shaft will become infinitely fast and infinitely slow(stopped), once per input shaft revolution. For the purpose of the invention, the infinitely slow angular rate(stopped) is useful, but the finitely fast angular rate is not.

Away from the vicinity of the stopped position, the offset is lessened to avoid an extremely high output shaft angular rate.

Figure 1:
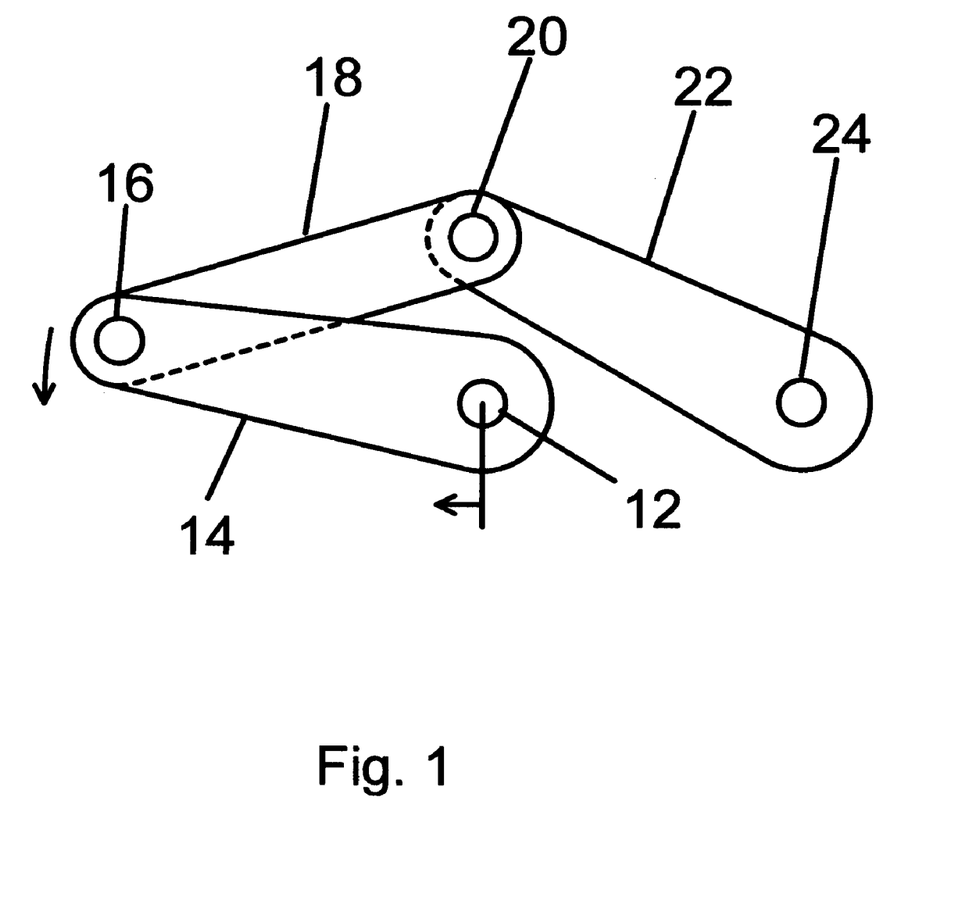
FIG. 1. Slowing the output shaft.

With some offset, there will be an output shaft angle where the output shaft axis, the input shaft axis and the input shaft crankpin axis line up. The input shaft angle where the output shaft is stopped can reasonably be about 45 degrees past the lined up angle. Regarding the force needed to stop the output shaft and anything connected to the output shaft, the force is transmitted through the output shaft crank, through the coupler to the input shaft crank. For less than about 30 degrees, the forces on the bearings would be unduly multiplied by the linkage involved. FIG. 1 shows the double crank four bar linkage slowing the output shaft.

Figure 2:
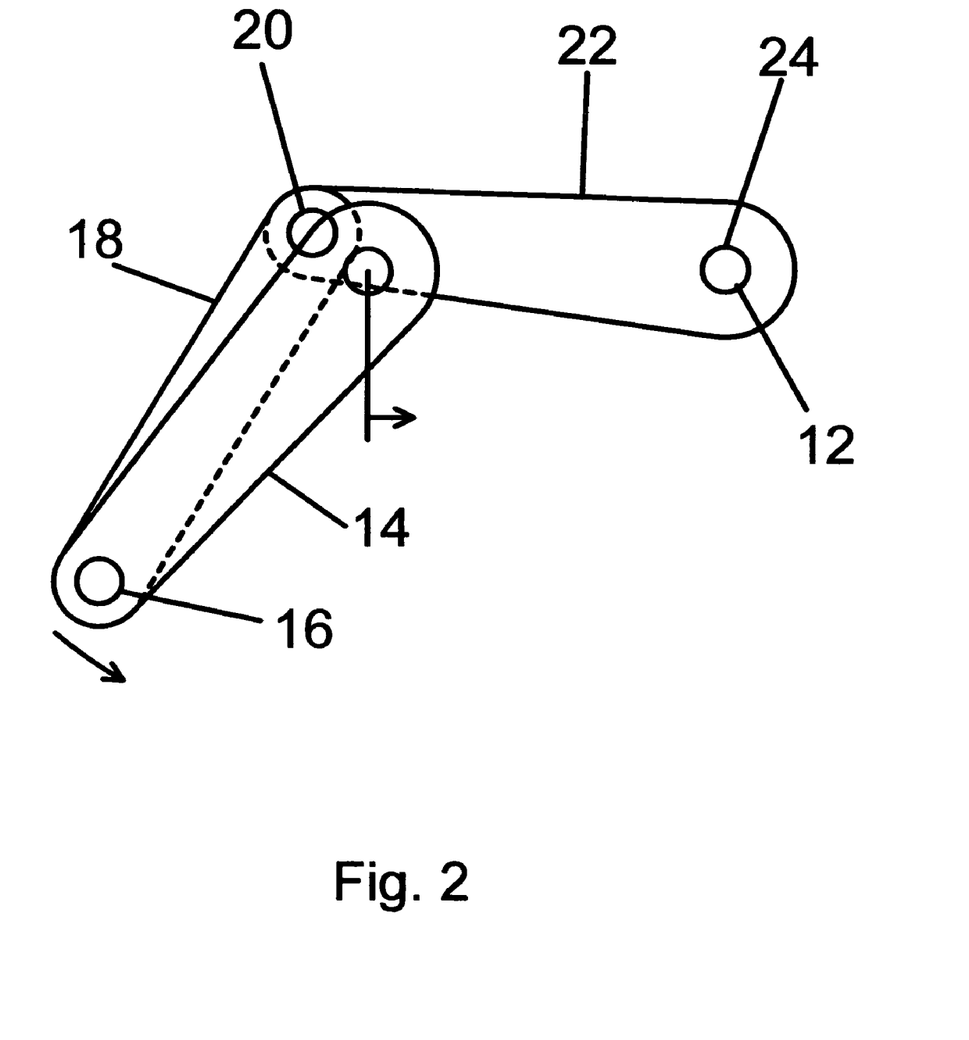
FIG. 2. Output shaft stopped.

FIG. 2 shows the output shaft stopped. The inward movement of the offset shaft tends to backup the output shaft. The turning of the input shaft tends to pull the output shaft forward. When these two cancel each other out, the output shaft is stopped.

Figure 3:
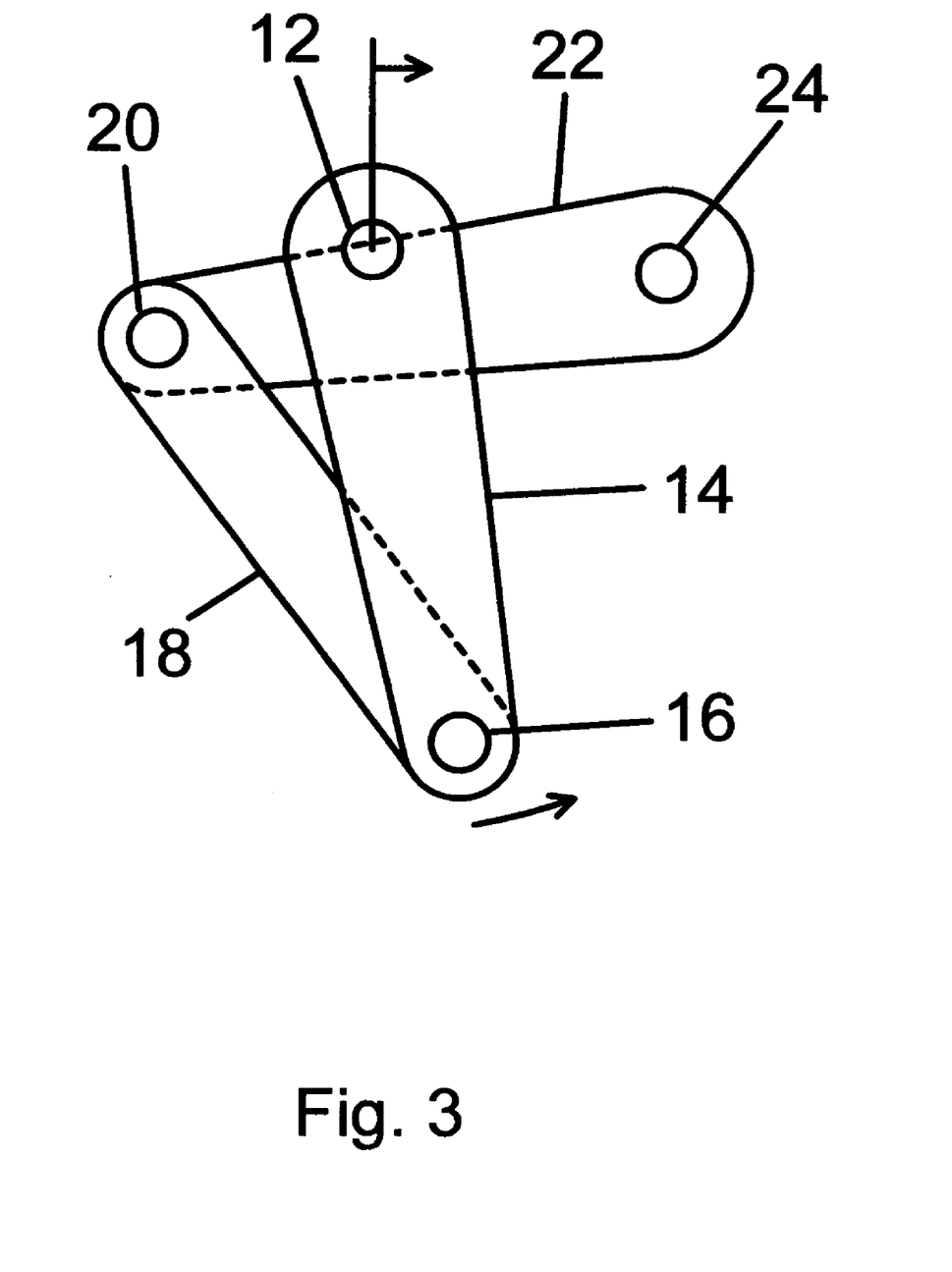
FIG. 3. Accelerating the output shaft.

FIG. 3 shows the output shaft being accelerated.

Figure 4:
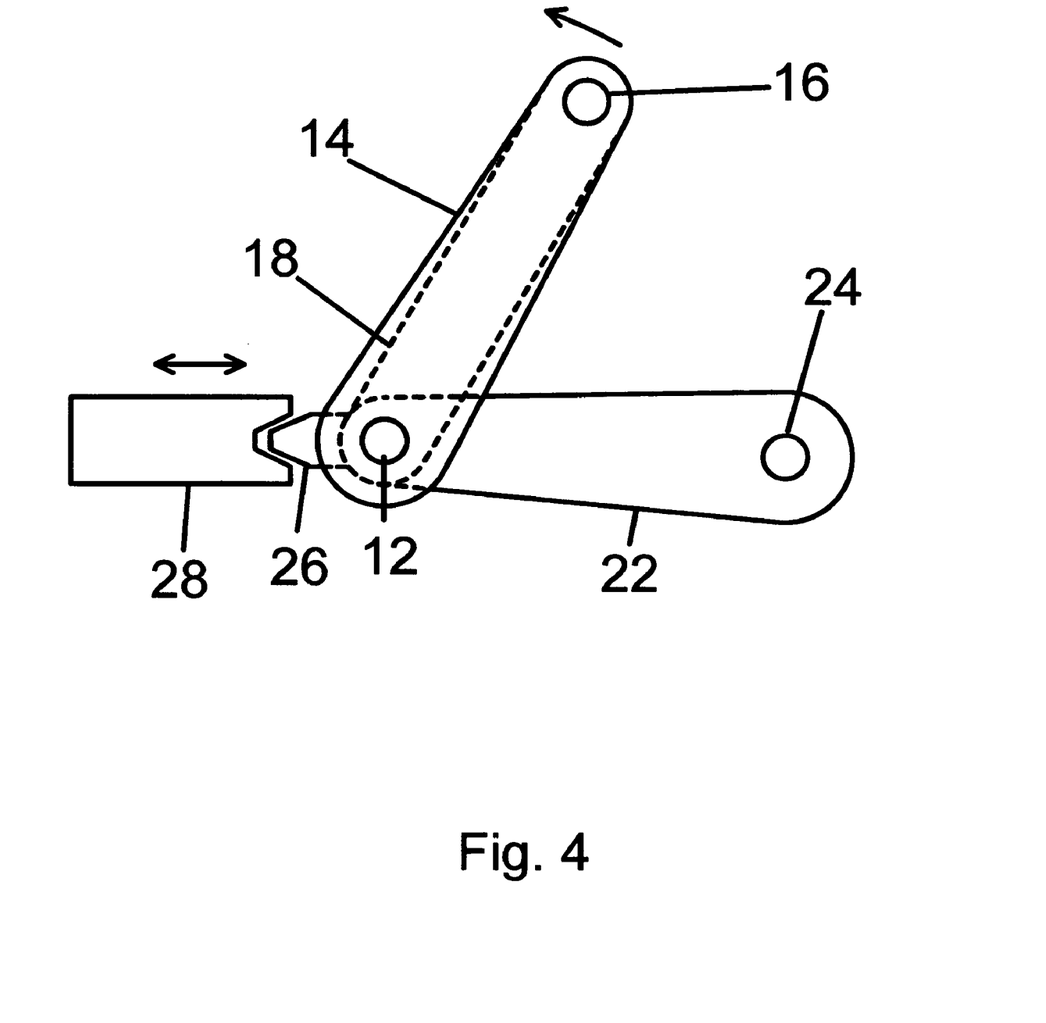
FIG. 4. No clutch stopped configuration.
Figure 7:
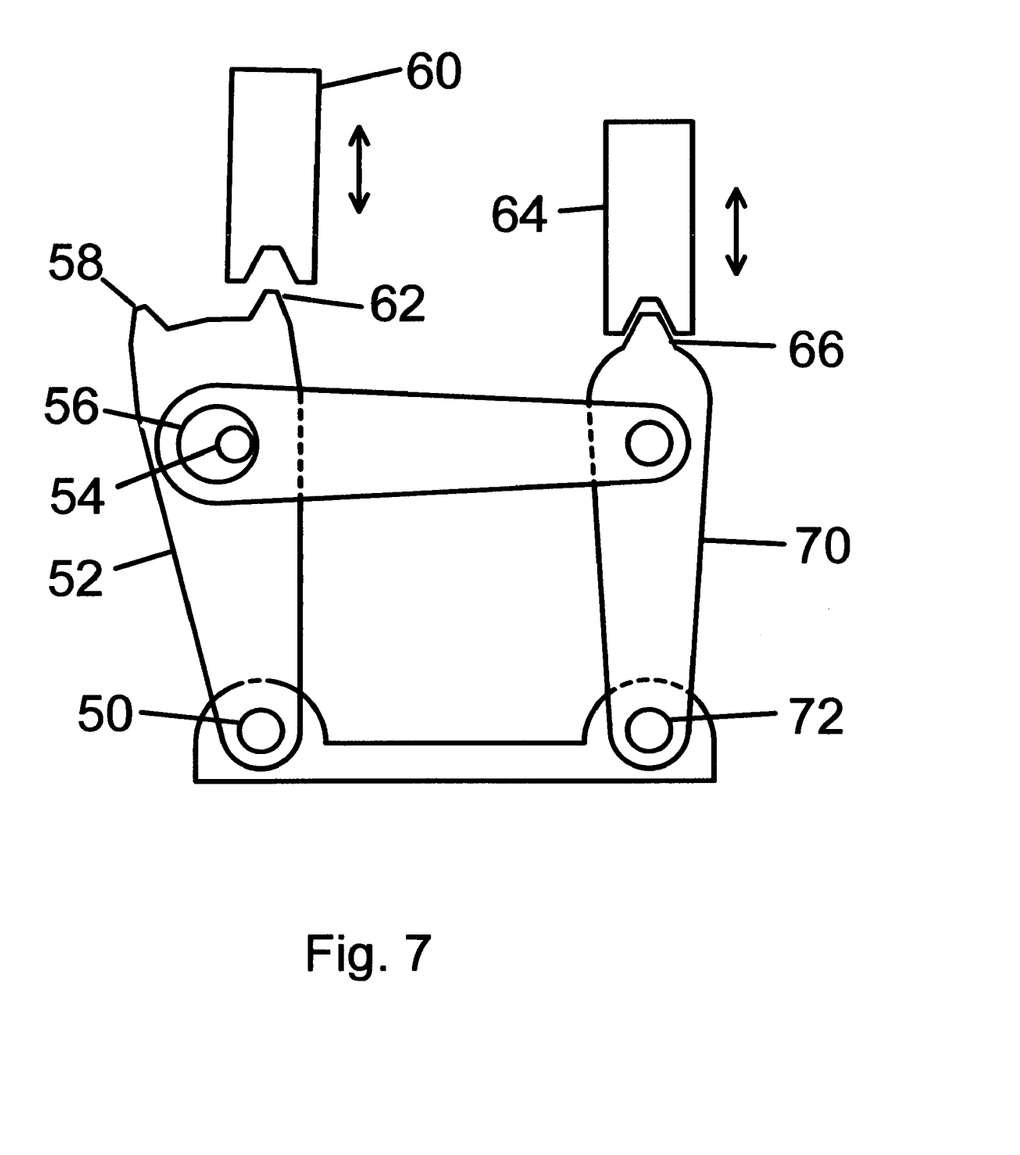
FIG. 7. Eccentric offset change mechanism.

FIG. 7 shows an eccentric 56 on the input shaft which moves the input shaft 12 cyclically between the offset needed for stopping the output shaft and a lesser or no offset needed to achieve the desired speed through the maximum speedup. The input shaft 54 is mounted on a bracket 52 which is mounted on a pivot 50. The phase of the eccentric 56 needs to be such that the maximum offset occurs near the stopping point of the output shaft 24. FIG. 7 eccentric offset change mechanism provides three modes of operation, cycle between the minimum and maximum offset, stay at the minimum offset and stay at the maximum offset. The latter is only used by the FIG. 4 no clutch stopped configuration.

Different means could be used to change the offset. Cams are another way to vary the offset, including desmodromic cams which provide positive movement in both directions. Also, an actuator of some kind could vary the offset, e.g. a hydraulic cylinder.

When the offset is varied substantially harmonically, the offset needed for the output shaft to come to a stop is slightly less then the coupler length. The motion of the input shaft due to the decreasing offset plus the motion of the input shaft crankpin due to the input shaft rotation together produce the crankpin motion. When the instantaneous center of this crankpin motion is lined up with the coupler endpoints, the crankpin motion does not move the output shaft crankpin, i.e. the output shaft is stopped. Call this the output shaft stopped angle.

A rotary mechanism connected to the output shaft, e.g. an engine's crankshaft, can be stopped by declutching it from the output shaft when the output shaft is stopped. And to restart, a clutch can engage when the output shaft is once again stopped.

Figure 6:
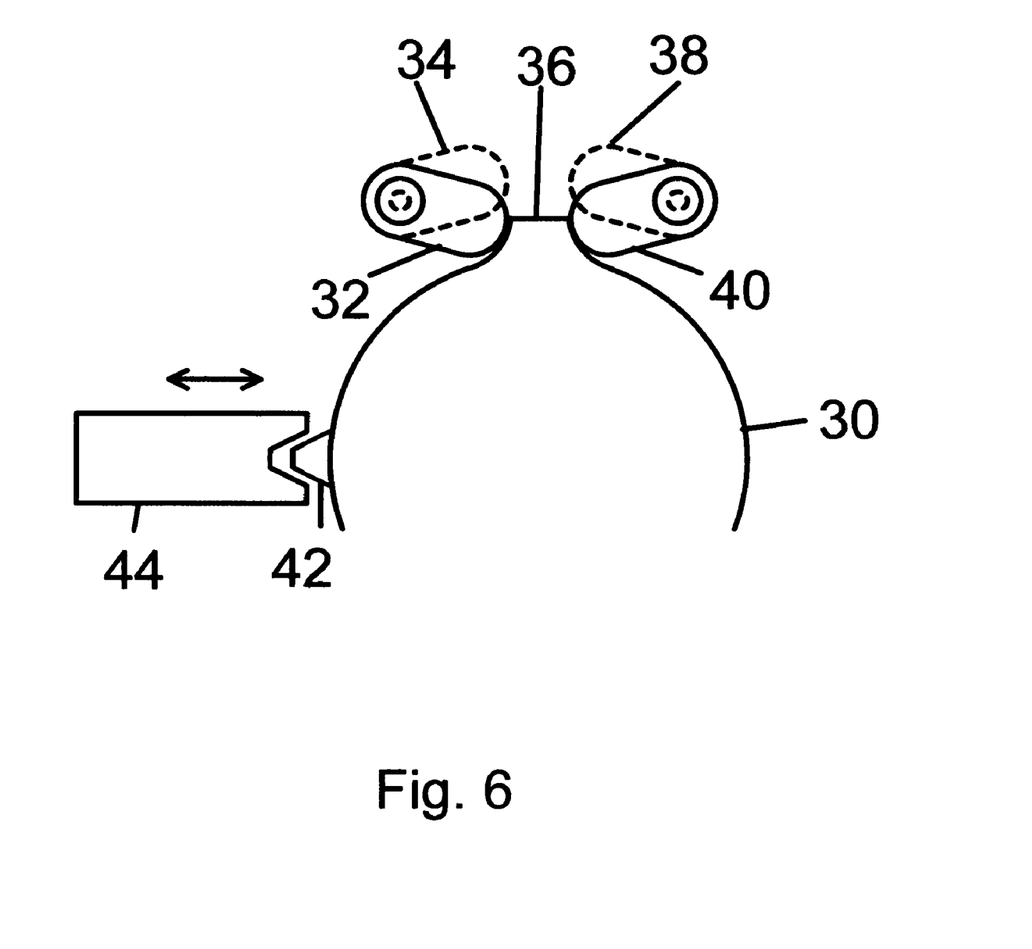
FIG. 6. Dog clutch.

FIG. 6 shows a way to implement the clutch such that the clutch function is implemented by an acceleration dog 40 which can accelerate the rotary mechanism and a deceleration dog 32 which can decelerate the rotary mechanism. When both dogs are engaged, the output shaft is firmly coupled to the rotary mechanism.

With this clutch, the timing of clutch dogs engagement/disengagement is not critical. The movement of the dogs into the engaged position can occur over tens of degrees prior to engagement and similarly for disengagment. There should be minimal shock loading on the dogs because the shaft speeds are matched, albeit briefly.

The engagement/disengagement of dogs could be by a cam that is moved into position which then engages/disengages the dogs as the input shaft reaches the cam profile that causes engagement/disengagement of the dogs.

Figure 5:
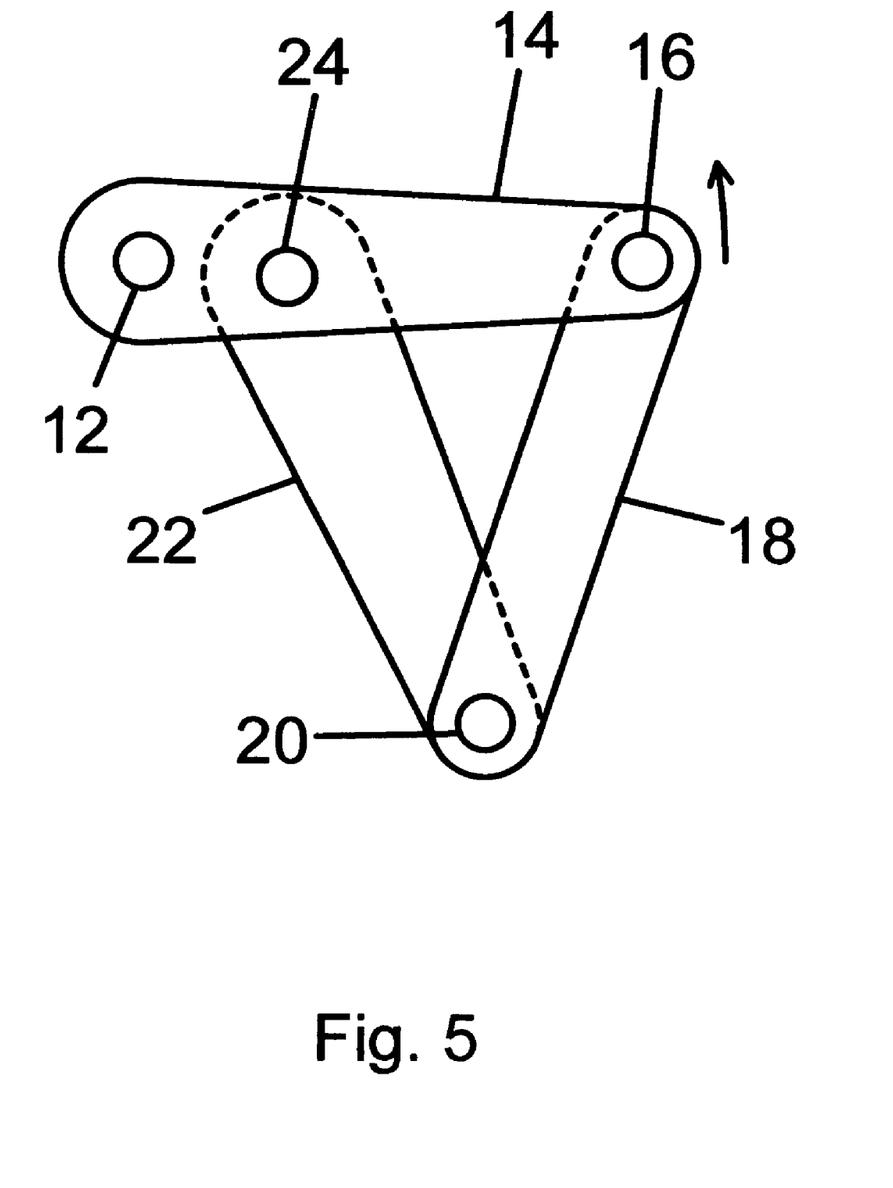
FIG. 5. Speedup of output shaft.

With the output shaft clutched into an engine's crankshaft, the minimum offset could be chosen to optimize the angular rate over time. FIG. 5 shows the speedup of the output shaft 24. Also, with the phase between the engine crankshaft and the output shaft such that there is a significant speedup near the engine's piston(s) top dead center and early expansion, the time of highest heat transfer is shortened. This increases the efficiency of the engine. The rotary mechanism, e.g. engine crankshaft, would always be stopped at the same angle, including at mechanism rest, e.g. engine shutdown. This is needed so that the preceding dog clutches take up smoothly and the phase relationship is maintained.

For a four cycle single cylinder engine, the offset could be varied over two crankshaft revolutions, e.g. by using a 1:2 gear reduction to drive an eccentric or a cam.

Operation

FIG. 7 shows the jaw for cyclic offset 64 engaged. The offset is varied substantially harmonically. The rotation of the eccentric on the input shaft 56 causes the input shaft support bracket to oscillate 52. With this design, the offset needed for the output shaft to come to a stop is slightly less then the coupler length. The motion of the input shaft due to the decreasing offset plus the motion of the input shaft crankpin due to the input shaft rotation together produce the crankpin motion. When the instantaneous center of this crankpin motion is lined up with the coupler endpoints, the motion does not move the output shaft crankpin, i.e. the output shaft is stopped. Call this the output shaft stopped angle. See FIG. 2.

Away from the vicinity of the stopped position, the substantially harmonic drive lessens the offset to avoid an extremely high output shaft angular rate.

A rotary mechanism connected to the output shaft, e.g. an engine's crankshaft, can be stopped by declutching it from the output shaft when the output shaft is stopped. And to restart, a clutch can engage when the output shaft is once again stopped.

To stop the rotary mechanism 30, when the output shaft 24 is being slowed to a stop by the deceleration dog 32, the acceleration dog 34 is disengaged prior to the output shaft 24 stopping. During the slowing, the acceleration dog 34 will not be transmitting any force and would be easy to disengage. Then after the rotary mechanism 30 is stopped, the deceleration dog 32 is disenagaged. This leaves the output rotary mechanism stopped. At this point, the rotary mechanism would be prevented from angularly drifting by a rotary 44 hold jaw engaged to rotary tooth 44. Note that the preceding jaw and tooth are between the dog clutch and the rotary mechanism, out of the way of the dog clutch.

To restart, the acceleration dog 40 is engaged prior to when the output shaft 24 stops. The acceleration dog makes contact at the output shaft stopped angle. Then as the output shaft is accelerated out of the stopped position by the acceleration dog, the rotary mechanism is also accelerated. The deceleration dog 32 is engaged as the rotary mechanism is accelerated. With both dogs now engaged, the output shaft is firmly coupled to the rotary mechanism.

Higher Speed Operation

For faster engine operation, the input shaft could be held at the minimum offset by the FIG. 7 offset change mechanism. This would be useful when it was desired to operate the engine faster for more power. To transition to holding the input shaft at the minimum offset, when the input shaft is at the minimum offset, disengage the jaw for cyclic offset 64 and engage the jaw for minimum and maximum offset 62. To transition back to cyclic offset variation, wait until the jaw for cyclic offset and the tooth for cyclic offset lineup, and then disengage the jaw for minimum and maximum offset 62 and engage the cyclic dog 64.

In both the minimum and maximum offset hold positions, the input shaft support bracket 52 is held steady while the link 68 moves the cyclic hold bracket 70 back and forth.

Starting The Engine

To start the engine, a starter motor could speed up the flywheel connected to the input shaft. When the flywheel has enough energy to cycle the engine, the clutch is engaged and the engine is started and runs until the flywheel is turning faster. This allows a less powerful starter motor.

Engine-Flywheel Hybrid Operation

For an engine-flywheel hybrid, the predicted flywheel speed a revolution or two ahead would be estimated. The engine crankshaft would be stopped until the predicted flywheel speed slowed to below a threshold, and then the engine would be started by engaging the clutch at the next opportunity. Then the engine would run until the predicted flywheel speed is faster than a second higher threshold, and then stop. This keeps the flywheel in a fairly narrow speed range. This is somewhat similar to the hit and miss engines of about a century ago.

For more power than the preceding would provide, the higher speed operation mode could be used.

For alternate firing of cylinders in a four cycle two cylinder engine, one cylinder would be part way into it's exhaust stroke and the other cylinder would be part way into it's compression stroke. This is for a double crank where the input shaft crank angle is ahead of the output shaft crank angle.

Note that when combustion and expansion occurs, the power flows out of the crankshaft, through the double crank to the input shaft, perhaps through a second double crank, to the flywheel.

DESCRIPTION AND
OPERATION-ALTERNATIVE EMBODIMENTS

In this alternative embodiment, the coupler length, the input shaft crank radius and output shaft crank radius have same dimension.

To stop the output shaft and keep it stopped, the offset would reach coupler length at around 45 degrees after the output shaft, the input shaft and the input shaft crankpin are all lined up, in that order.

Then the input shaft crankpin will spin the coupler around the stationary output shaft crankpin. In this output shaft stopped configuration, an output shaft jaw 28 engaged to output shaft stop tooth 26 would keep it from drifting angularly. Also, the offset must be held steady. FIG. 7 shows the eccentric offset change mechanism. To hold the offset steady, engage the jaw for minimum and maximum offset 62 with the tooth for maximum offset 62 while disengaging the cyclic dog 64. Note that no clutch is needed to stop the output shaft.

To transition out of the output shaft stopped configuration, the offset is decreased, beginning at the input shaft angle when maximum offset occurs. This is also when the jaw for cyclic offset 64 and the tooth for cyclic offset 66 lineup, and then disengage the jaw for minimum and maximum offset 62 and engage the cyclic dog 64.

Higher speed operation would be as in the first version.

Alternative to the dogs clutches of FIG. 6 is to use a right hand one way jaw clutch plus a left hand one way jaw clutch, one concentric to the other. The engagement/disengagement could function similarly to the dog clutch.

CONCLUSION, RAMIFICATIONS AND SCOPE

Applicant submits that the rotary start stop mechanism can be used to make an engine-flywheel hybrid which would be more efficient, lighter and cheaper than an engine-electric hybrid that uses batteries for energy storage. Further, that when used as an auto engine, the part load efficiency would be near the maximum efficiency of the engine, nearly doubling the miles per gallon of the auto.

Many modifications and variations of the present invention are possible in light of the above teachings. It is therefore to be understood that within the scope of the appended claims, the invention may be practised otherwise than specifically described.

I claim:

1. A method for stopping and then later selectively restarting an output shaft which is connected to a rotating input shaft by a double crank four bar linkage, which has an input shaft crank with a crankpin, an output shaft crank with a crankpin and a coupler connecting the crankpins, with the crank radius on the input shaft substantially equal to the coupler length, the axes of the input shaft and output shaft substantially parallel, and beginning with the input shaft and output shaft offset less than the coupler length wherein the method to stop and later selectively restart comprises:

a. stopping involves increasing the offset of the input shaft and output shaft to coupler length within 90 degrees after the output shaft axis, the input shaft axis and the input shaft crankpin are all substantially in the same plane and the input shaft crankpin is furthest from the output shaft, the offset is held constant while the coupler, driven by the input shaft crankpin, spins around the stationary output shaft crankpin, b. restarting involves decreasing the offset from coupler length beginning within 90 degrees after the output shaft axis, the input shaft axis and the input shaft crankpin are all substantially in the same plane and the input shaft crankpin is furthest from the output shaft, whereby the rotational energy of the output shaft stopping is transferred into the input shaft and kinetic energy needed to restart the output shaft is transferred from the input shaft.

2. A method for stopping and then later selectively restarting an output shaft which is connected to a rotating input shaft by a double crank four bar linkage, which has an input shaft crank with a crankpin, an output shaft crank with a crankpin and a coupler connecting the crankpins, with the crank radius on the input shaft substantially equal to the coupler length, the axes of the input shaft and output shaft substantially parallel, an eccentric on the input shaft which drives a link, the other end of said link may be held fixed so as to cause the input shaft position to change, or the other end of said link allowed to oscillate so as to allow the input shaft to remain in a fixed position, said eccentric and link positioned and phased to cause the input shaft and output shaft crankpin to become coincident at the maximum offset of input shaft and output shaft, the input shaft crankpin phased such that at coincidence the input shaft crankpin is becoming closer to the output shaft yet is further away than said coupler length from the output shaft, the input shaft may be held in the coincidence position, and beginning with the input shaft and output shaft offset less than the coupler length wherein the method to stop and later selectively restart comprises:

a. stopping involves holding the other end of said link until the input shaft and output shaft crankpin become coincident, then the other end of said link is allowed to oscillate, the input shaft position is held constant while the coupler, driven by the input shaft crankpin, spins around the stationary output shaft crankpin, b. restarting involves holding the other end of said link when the input shaft angle is the same as when it arrived at the coincidence position and not holding the input shaft in a fixed position, whereby the rotational energy of the output shaft stopping is transferred into the input shaft and kinetic energy needed to restart the output shaft is transferred from the input shaft.

3. The method of claim 2 further comprising an output shaft hold jaw to prevent the output shaft from angularly drifting while the input shaft is in the spin around position; wherein the steps comprise: engaging said output shaft hold jaw as said input shaft becomes coincident with said output shaft crankpin, and disengaging said output shaft holc jaw as said input shaft becomes not coincident with said output shaft crankpin.

* * * * *